June 30, 1942.    H. N. BOETCHER ET AL    2,288,433
WELDING JOINT
Filed Aug. 19, 1939

Inventors
Hans Nielsen Boetcher
John William Hudnall, Jr.
By Cameron, Kerkam + Sutton
Attorneys Patented June 30, 1942

2,288,433

UNITED STATES PATENT OFFICE 2,288,433

WELDING JOINT

Hans Nielsen Boetcher and John William Hudnall, Jr., Baltimore, Md., assignors to Consolidated Gas Electric Light and Power Company of Baltimore, Baltimore, Md., a corporation of Maryland Application August 19, 1939, Serial No. 291,088

12 Claims. (Cl. 219—10)

This invention relates to the welding of pipes and plates of moderate or heavy metal thickness, and particularly to butt joints as made between sections of pipe or other component parts of piping, although it has an advantageous application also to other manufacturing processes involving the welding of pipe, plate or the like.

The object of the invention is to provide welded joints with substantially complete penetration to the root without the use of backing rings or strips. Other objects will appear hereinafter.

The invention will be more readily understood by reference to the accompanying drawing in which.

Figure 1:
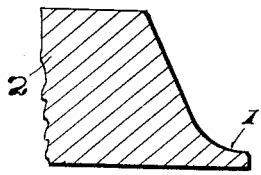
Fig. 1 is a section through the end of a piece of pipe suitably machined for making the joint.

It has long been recognized that welds subjected to high stresses, such as caused by high pressures or high temperatures in piping and pressure vessels or by mechanical forces, must have substantially complete penetration as any lack of such penetration may result in slow propagation of cracks from the root by reason of fatigue or other forces. Wherever possible, this is usually accomplished by double welding from both sides of the wall. This method cannot be used, however, in many cases in which one side of the weld is not accessible.

In the prior art, the practically complete penetration has been obtained mostly by the use of backing rings or strips. Unless the pipe or apparatus is of such size and design that such rings or strips can be and are removed after welding, which is an infrequent case, they present serious disadvantages. If they protrude beyond the inside of the wall, they restrict the flow of fluids, such as liquids, steam or gases. If they are inserted in a recess formed in the wall, they restrict the load-carrying area of the weld, unless the pipe or plate ends are upset, and cause stress concentrations in any case. In addition, the rings or strips cause and form gaps, aggravated by deformations resulting from welding, in which scale and other deposits may lodge and which may give rise to corrosion and to turbulent flow in the pipe. The chilling effects during electric arc welding at the rings or strips result in unfavorable metallurgical conditions especially in the metal adjoining the weld.

If welding is attempted without the use of backing rings or strips, practically complete penetration to the opposite side of the pipe or plate wall is not obtained consistently with moderate or large wall thicknesses by the means known prior to the present invention. In order to avoid chilling, the operator has to use a relatively high heat input involving the presence of a relatively large mass of molten metal. This condition results in an uncontrolled situation giving uncertain penetration with either insufficient penetration or the equally undesirable projection of weld metal beyond the wall (so-called "icicles".)

One method devised in the prior art to overcome the difficulties without using a backing ring or strip employs lips which are rolled or bent beyond the inner surface of the pipe or vessel to such an extent that the groove resulting from placing the lips end to end extends to a point in line with or below the inner surface of the wall of the pipe or vessel. The latter condition has been modified sometimes to take into account the minimum amount of penetration of the electric arc welding into the lips, this minimum penetration to extend to a point in line with or below the inner surface of the wall of the pipe or vessel. In either case, the lips serve to form a cup into which the weld metal is poured. They are not part of the weld any more than a backing ring or strip and, as a matter of fact, constitute backing rings or strips integral with the pipe or plate. Since, however, the lips are fused to the weld, the narrow separating gap between the lips constitutes a crack at the root of the weld itself which has the disadvantage of incomplete penetration and may initiate corrosion and may progress into the weld, especially in the presence of external bending stresses.

Figure 2:
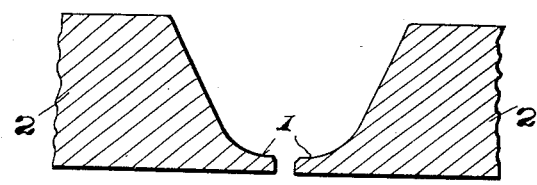
Fig. 2 is a section through the ends of two pieces of pipe suitably machined and placed in position for welding.
Figure 3:
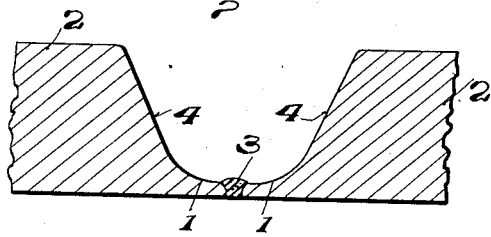
Fig. 3 is a section through the ends of two pieces of pipe after the lips 1 have been joined by means of gas welding.
Figure 4:
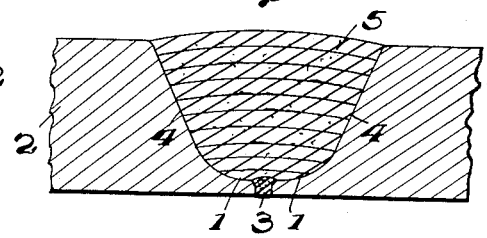
Fig. 4 is a section through the ends of two pieces of pipe after the joint has been finished.
Figure 5:
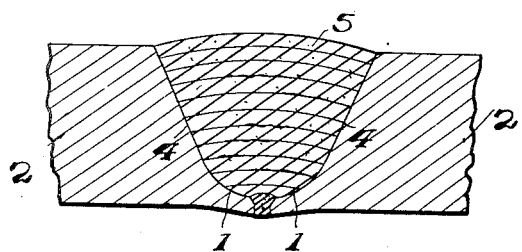
Fig. 5 is a section through a finished joint in which satisfactory radial alignment of the pipe ends is obtained by rolling the lips 1 toward the inside of the pipe.

The present invention avoids the use of either integral or separate backing rings or strips by employing a small butt weld to join suitably shaped and spaced lips 1 on pipe or plates 2 as shown in the drawing. Referring to the drawing, which illustrates diagrammatically a preferred procedure, the ends of the pipes, plates or other elements to be joined are formed in any suitable way so as to provide lips which are so shaped as to be suitable for butt welding by any manner of welding light gauge material. Thickness of the lips may be desirably on the order of ⅛″ and they may be chamfered, as shown in Fig. 1. The lips on the two elements to be joined are brought into substantial alignment, as shown in Fig. 2, but with the tips of the lips spaced at a distance which is suitable for butt welding of relatively thin plates, the spacing preferably being on the order of the thickness of the lips, say ⅛″. A butt weld is then made between the lips, by any suitable form of fusion welding, as shown at 3 in Fig. 3. This butt weld constitutes the first bead of the main weld, assumes its share of the stresses and is an integral and essential part of the main weld. Butt welds of thin plates have been made successfully in the past, obtaining good and consistent penetration, in view of the fact that good control of actual welding was made possible by small heat input and small masses of molten metal. Though such welds have been and can be made by all known methods of fusion welding, best results have been obtained using methods involving close control of heat input such as gas welding, atomic hydrogen welding, and carbon electric arc welding. The present invention makes use of this past knowledge by changing the initial welding operation with pipe or plate of moderate and large thickness into a welding of thin plates by properly shaping and spacing the lips for butt welding. After substantially complete penetration is obtained by the butt welding of the lips, the weld is built up, in the groove 4 so formed, in the normal manner, the metal filling the groove 4 as shown at 5 in Fig. 4.

Though any suitable method of welding may be employed to effect the butt welding of the lips, with preference given to the methods proven most successful in the welding of thin plate, gas welding has practical advantages over other methods and has been used most successfully in the work actually done. Using gas welding, with proper technique, it is not difficult to obtain a thoroughly sound weld with practically complete penetration in an operation of this type. Gas welding is superior to electric arc welding in this work as a consistently good weld necessitates considerable flexibility in the relative input of heat and metal. As the lips are thin and the spacing is small—both being for instance about ⅛″—a small amount of metal suffices to bond the lips. It has been found possible to accomplish this operation without noticeable oxidation of the weld metal and with a minimum of scaling on the metal of the pipe or plate, appreciably less than is experienced in comparable welds made by other methods. Oxidation has been reduced still more in many cases by the use of a flux, preferably one which can be removed later by washing with water, to "shield" the weld during welding. The characteristics of gas welding, furthermore, result in good metallurgical properties of the metal in weld and adjoining metal, with the small size of the gas weld keeping the heat input low enough to avoid metallurgical changes such as would be undesirable in a weld otherwise made by means of the electric arc.

The physical properties of welds made under this invention, as determined in accordance with recognized Codes, disclose such welds to have superior quality. For instance, root break tests as required by the Boiler Code of the American Society of Mechanical Engineers which is the accepted law for boiler construction in by far most States have shown consistently high quality with elongations in many cases above 50% across the weld without cracking; such tests are the most severe tests known for determining the grade of penetration.

Figure 6:
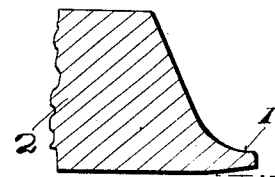
Figs. 6 to 8 show the steps used to obtain the welding bevel employed in the weld shown by Fig. 5.
Figure 7:
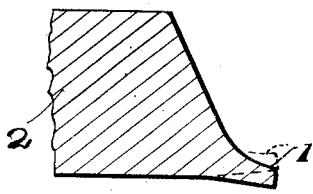
Figure 8:
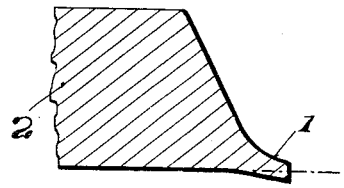

Though experience has shown joints made under this invention to be less sensitive to axial and radial misalignment than joints made with backing rings or strips, due to the absence of features involving gaps after welding, alignment is recognized to be an important feature in all welding joints for severe service conditions. The commercially permitted tolerances in diameter and thickness of pipe usually make it necessary to make provisions for proper radial alignment. Such alignment for the joint under this invention, especially in piping, may be improved by internal machining of the wall, as has been used in the past with other types of joints, or by bending the lip toward the inside or by combining these two methods. Figs. 6 to 8 show consecutively one method which has been used to obtain radial alignment in this manner, including the forming of the lips, the bending of the lips to the extent necessary to obtain proper alignment and the desired shaping of the lips, although it will be understood that the desired alignment may be obtained by other means giving the result described. The bending of the lips in this case differs substantially from the previously mentioned method of making joints without backing rings or strips. In view of the penetration obtained under the present invention, the bending is not needed to obtain sufficient throat dimensions in the weld and is, therefore, continued only far enough to give proper alignment under the limits of tolerances of diameters and/or thickness permitted for the pipe or plate.

What is claimed is:

1. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in two separate steps, first butt welding the opposed lips together by fusion welding, in the absence of a backing element at the joint, so that only approximately the contiguous extremities of said lips are joined, and then thereafter filling the groove formed by the butt welding of the lips with weld metal.

2. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, opposing the extremities of said lips at a spacing suitable for butt welding and in separate steps, first butt welding approximately only the contiguous extremities of the opposed lips together by gas welding, in the absence of a backing element at the joint and then thereafter filling the groove formed by the butt welding of the lips with weld metal.

3. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, opposing the extremities of said lips at a spacing suitable for butt welding, and in separate steps, first butt welding the opposed lips together in the absence of a backing element at the joint by fusing together approximately only the extremities of said lips, and then thereafter filling the groove formed by the butt welding of the lips with weld metal by electric arc welding.

4. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, bending one or both of the lips to be opposed to obtain substantial alignment between the extremities thereof, opposing the extremities of said lips at a spacing suitable for butt welding of relatively light gauge pipe or plate with substantially complete penetration to the root, and in separate steps, first butt welding approximately only the contiguous extremities of the opposed lips together by fusion welding in the absence of a backing element at the joint and then thereafter filling the groove formed by the butt welding of the lips with weld metal.

5. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in separate steps first fusion welding approximately only the adjacent extremities of the opposed lips together in the absence of a backing element at the joint, and then thereafter filling the groove formed by said welding of the lips with weld metal.

6. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in separate steps first welding approximately only the adjacent extremities of the opposed lips together by gas welding in the absence of a backing element at the joint, and then thereafter filling the groove formed by said welding of the lips with weld metal by electric arc welding.

7. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in separate steps first fusing approximately only the adjacent extremities of the opposed lips together, in the absence of a backing element at the joint, while keeping the heat input low enough to avoid undesirable metallurgical changes in the base metal on either side of the lips, and then thereafter filling the groove formed by said welding of the lips with weld metal.

8. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having squared extremities and a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in separate steps first fusion welding approximately only the adjacent extremities of the opposed lips together, in the absence of a backing element at the joint, by a small amount of molten metal substantially only sufficient to bridge the gap at said lips, and then thereafter filling the groove formed by said welding of the lips with weld metal.

9. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having squared extremities and a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in separate steps first fusion welding approximately only the adjacent extremities of the opposed lips together in the absence of a backing element at the joint, and thereafter filling the groove formed by said welding of the lips by using a different type of welding than employed in first uniting said lips.

10. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having squared extremities and a shape and thickness suitable for the butt welding of light gauge pipe or plate with substantially complete penetration to the root, opposing the extremities of said lips at a spacing suitable for butt welding of relatively light gauge pipe or plate with substantially complete penetration to the root, and in separate steps first fusion welding approximately only the adjacent extremities of the opposed lips together, in the absence of a backing element at the joint, by a type of welding wherein the heat input is capable of relatively exact control, and then thereafter filling the groove formed by said welding of the lips with weld metal by using a different type of welding.

11. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, bending the lips to be opposed in the direction to increase the depth of the groove to be formed thereby, opposing the extremities of said lips at a spacing suitable for butt welding of relatively light gauge pipe or plate with substantially complete penetration to the root, and in separate steps first fusion welding approximately only the adjacent extremities of the opposed lips together, in the absence of a backing element at the joint, by a small amount of molten metal substantially only sufficient to bridge the gap at said lips, and then thereafter filling the groove formed by said welding of the lips with weld metal.

12. The method of welding the ends of pipe, pipe sections, walls of pressure containers and conduits, and the like, of moderate or heavy metal thicknesses and in the absence of a backing element, where a transverse or circumferential joint is to be formed or one that is accessible from only one side thereof, which includes the steps of shaping the edges to be welded to form protruding lips at the root which are integral and homogeneous with and formed of the same material as the entire edges to be united, said lips being of a thickness approximating light gauge pipe or plate and having a shape and thickness suitable for the butt welding of light gauge pipe or plate with substantially complete penetration to the root, bending the lips to be opposed in the direction to increase the depth of the groove to be formed thereby, opposing the extremities of said lips at a spacing suitable for butt welding of relatively light gauge pipe or plate with substantially complete penetration to the root, and in separate steps first fusion welding approximately only the adjacent extremities of the opposed lips together in the absence of a backing element at the joint, and thereafter filling the groove formed by said welding of the lips by using a different type of welding than employed in first uniting said lips.

HANS NIELSEN BOETCHER.
JOHN WILLIAM HUDNALL, JR.